US007310520B2

(12) United States Patent
Kim

(10) Patent No.: US 7,310,520 B2
(45) Date of Patent: Dec. 18, 2007

(54) FILE CONSTRUCTION FOR MOBILE COMMUNICATION DEVICE INCLUDING MACHINE-LANGUAGE-CODE EXECUTION SEGMENT AND FILE EXECUTION METHOD USING THE SAME

(75) Inventor: Yong-Hoon Kim, Gyeonggi-do (KR)

(73) Assignee: SK Teletech Co., Ltd., Seoul (KR)

( * ) Notice: Subject to any disclaimer, the term of this patent is extended or adjusted under 35 U.S.C. 154(b) by 481 days.

(21) Appl. No.: 10/334,531

(22) Filed: Dec. 30, 2002

(65) Prior Publication Data
US 2003/0153304 A1 Aug. 14, 2003

(30) Foreign Application Priority Data
Dec. 28, 2001 (KR) ............... 10-2001-0086661

(51) Int. Cl.
*H04M 3/00* (2006.01)
(52) U.S. Cl. .......... 455/419; 455/418; 455/186.1
(58) Field of Classification Search ........ 455/414.1, 455/418–419, 186.1; 370/392; 709/246; 718/104
See application file for complete search history.

(56) References Cited
U.S. PATENT DOCUMENTS

| | | | | |
|---|---|---|---|---|
| 5,654,696 A | * | 8/1997 | Barrett et al. ............ | 340/5.33 |
| 6,476,828 B1 | * | 11/2002 | Burkett et al. ........... | 715/760 |
| 6,747,920 B2 | * | 6/2004 | Denda et al. ............ | 369/30.9 |
| 6,779,045 B2 | * | 8/2004 | Kendall et al. .......... | 710/5 |
| 2002/0004402 A1 | * | 1/2002 | Suzuki ................... | 455/456 |
| 2002/0112078 A1 | * | 8/2002 | Yach ..................... | 709/248 |
| 2003/0086438 A1 | * | 5/2003 | Laumen et al. ......... | 370/462 |
| 2003/0093643 A1 | * | 5/2003 | Britt, Jr. ................ | 711/170 |
| 2003/0101195 A1 | * | 5/2003 | Linhart .................. | 707/102 |
| 2004/0038675 A1 | * | 2/2004 | Criss et al. ............. | 455/419 |
| 2004/0068665 A1 | * | 4/2004 | Fox et al. ............... | 713/201 |
| 2004/0083384 A1 | * | 4/2004 | Hypponen .............. | 713/200 |
| 2004/0202132 A1 | * | 10/2004 | Heinonen et al. ........ | 370/331 |
| 2005/0010694 A1 | * | 1/2005 | Ma et al. ............... | 709/250 |

* cited by examiner

*Primary Examiner*—Duc M. Nguyen
*Assistant Examiner*—Wayne Cai
(74) *Attorney, Agent, or Firm*—Lahive & Cockfield, LLP

(57) ABSTRACT

The present invention relates to a file construction for mobile communication device including an execution segment in form of machine language codes and a file execution method using the same, whereby a file in accordance with the present invention comprises a header, a file execution segment formed in machine language codes, and a resource segment to be selected by languages; wherein the header includes data for performing one or more of the functions of: 1) verifying reliability/validity of the file, 2) restricting use of the file (by period of the use, by times of the use), and 3) automatic updating of the file.

4 Claims, 5 Drawing Sheets

[Fig. 1]
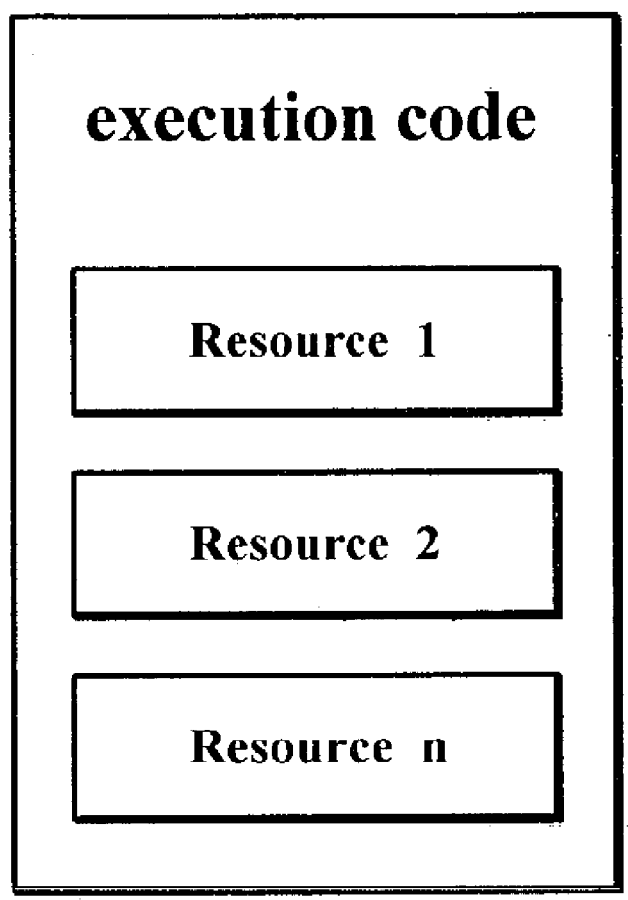

[Fig. 2]
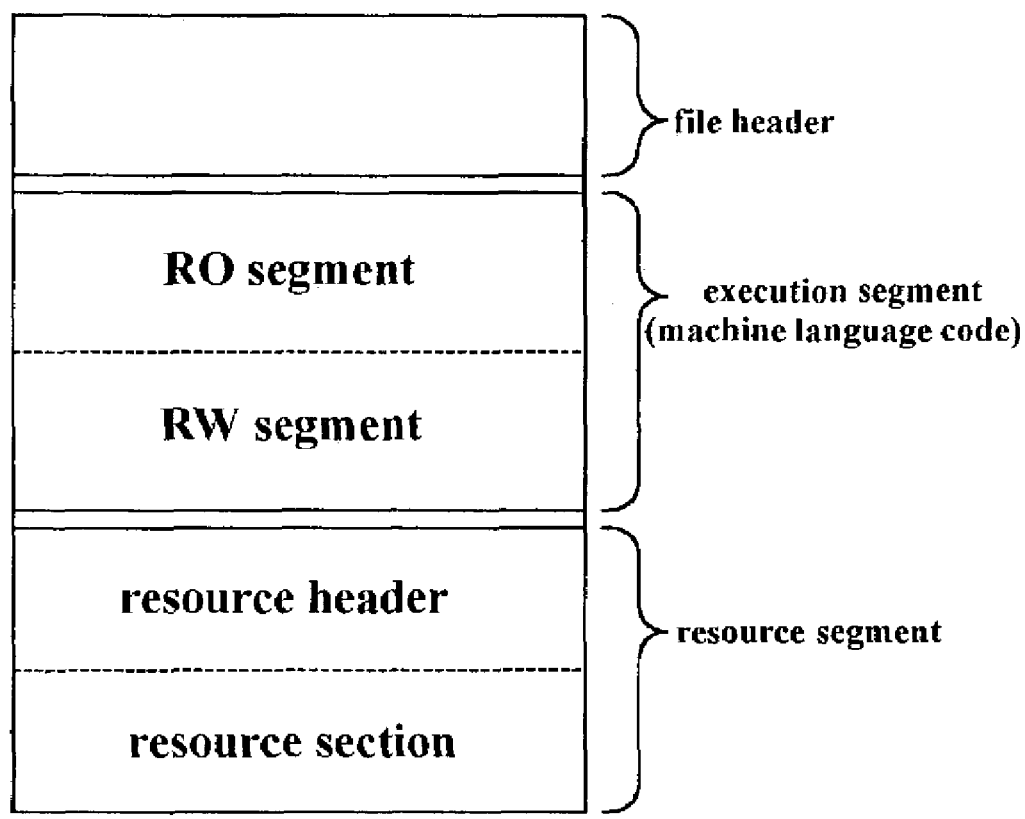

[Fig. 3]
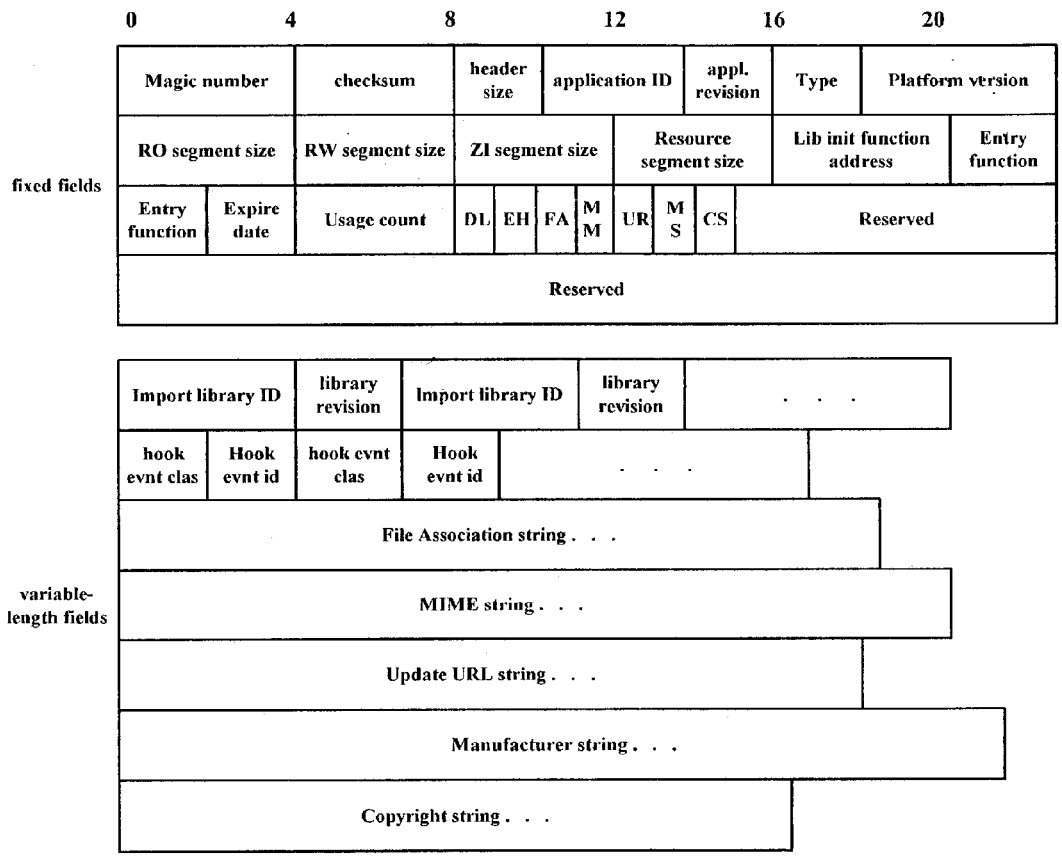

[Fig. 4]

[Resource Segment Hex Format]

| 0 | | 4 | 8 | | 12 | 16 | | |
|---|---|---|---|---|---|---|---|---|
| # sec | # img sec | country code | section address | | country code | section address | | Resource Header |
| img code | img section address | | img code | img section address | | . . . | | |

| section size | | title code | app title address | | I T | icon size | | icon address | T T | | |
|---|---|---|---|---|---|---|---|---|---|---|---|
| thumbnail size | | thumbnail address | | # string | str # 0 code | str # 0 address | | str # 1 code | | str # 1 address | |
| . . . . | | | | | | | | | | | Resource Section # 0 |
| App title string- 0, icon data, thumbnail data, token # 0 string - 0, token # 1 string - 0, token # 2 string - 0, token # 3 string - 0, token # 4 string - 0, token # 5 string - 0, token # 6 string - 0,... | | | | | | | | | | | |

| section size | | title code | app title address | | I T | icon size | | icon address | T T | | |
|---|---|---|---|---|---|---|---|---|---|---|---|
| thumbnail size | | thumbnail address | | # string | str # 0 code | str # 0 address | | str # 1 code | | str # 1 address | |
| . . . . | | | | | | | | | | | Resource Section # 1 |
| App title string- 0, icon data, thumbnail data, token # 0 string - 0, token # 1 string - 0, token # 2 string - 0, token # 3 string - 0, token # 4 string - 0, token # 5 string - 0, token # 6 string - 0,... | | | | | | | | | | | |

| img section size | img data |
|---|---|
| img section size | img data |
| img section size | img data |
| img section size | img data |

Image section

[Fig. 5]
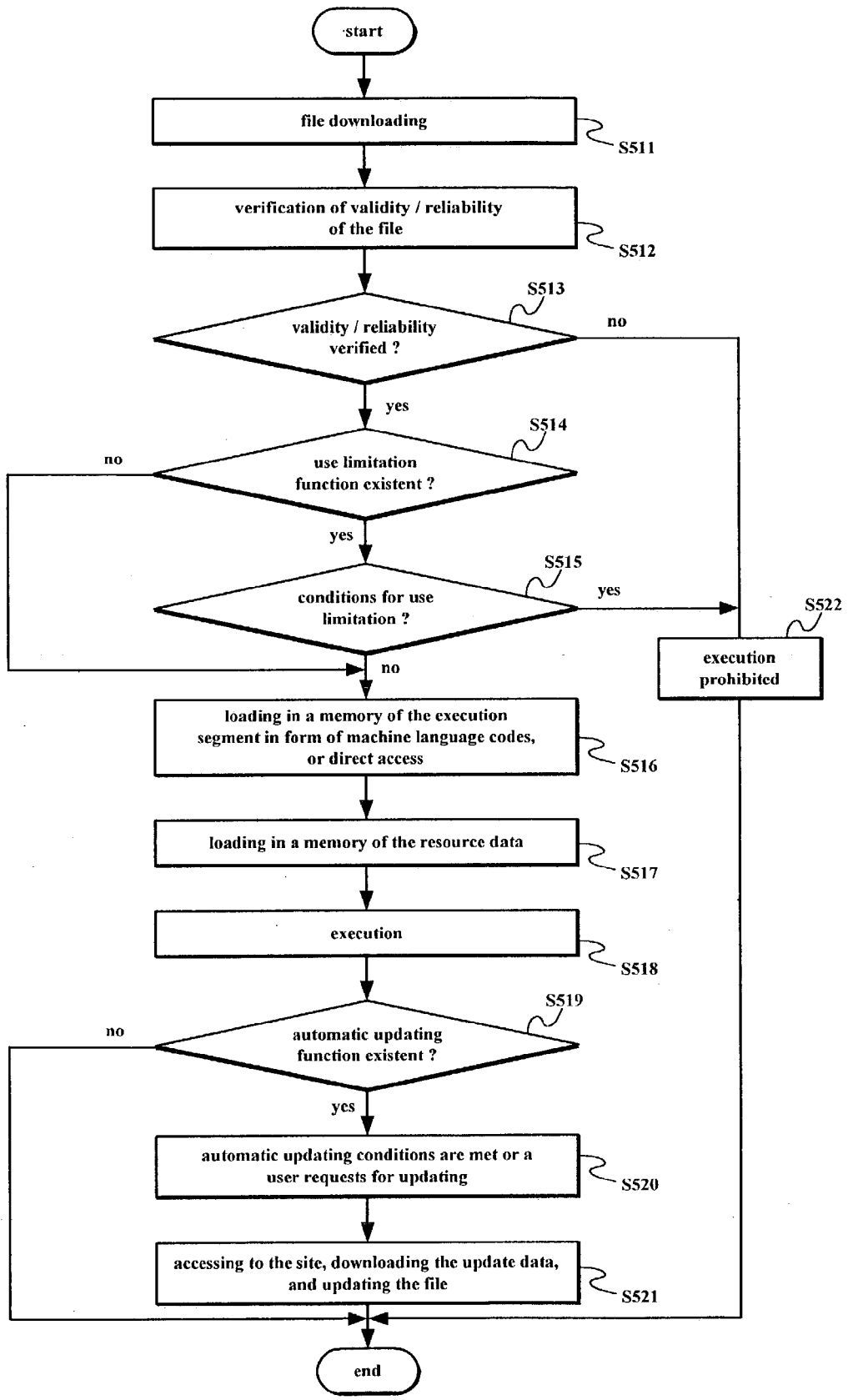

FILE CONSTRUCTION FOR MOBILE COMMUNICATION DEVICE INCLUDING MACHINE-LANGUAGE-CODE EXECUTION SEGMENT AND FILE EXECUTION METHOD USING THE SAME

RELATED APPLICATION

The current application claims priority from Korean Patent Application Number 2001-86661, which was filed on Dec. 28, 2001, the contents of which are incorporated herein by reference.

FIELD OF THE INVENTION

The present invention relates generally to a file construction for mobile communication device including a machine-language-code execution segment and a file execution method using the same, in particular, a file construction for mobile communication device including a machine language code that can be executed directly by a processor of the mobile communication device, URL information for verification of file reliability and validity, for limiting file execution time and file execution period, and for automatic updating; as well as a file execution method using the same.

DESCRIPTION OF THE PRIOR ART

With spreading use of mobile communication services in recent days, a lot of users receive one or more mobile communication services. Having started with phone call service and text/voice message transmission services, mobile communication services now cover providing wireless Internet service, providing contents for mobile communication devices, etc.

In particular, the above wireless Internet service allows a user to obtain desired information by connecting to a server on the Internet as well as to download by radio various Internet contents files such as images, bell sounds, games, etc. using a mobile communication device.

Generally, a platform independent from the operation system or the hardware is used for downloading and executing a file for mobile communication device, and such file is generated using a predetermined development kit.

A file for mobile communication device needs to be of small memory size due to the restricted memory capacity of such device and uses API, which is a standardized library, for convenience of programming and execution. The API, being stored together with the platform for executing contents of the mobile communication device, can simplify the contents application programs and reduce the memory size thereof.

However, in order for a conventional file for mobile communication device to be executed, a byte code based program that cannot be executed by a processor of the communication device needs to be downloaded, and the byte code needs to be interpreted into a machine language code, by using a virtual machine (VM) such as KVM, GVM, JVM installed in the communication device as an execution platform, to subsequently be executed. The above described method as that executed by JAVA based wireless platforms can enhance compatibility with other types of devices due to its platform independence, but, on the other hand, it requires long time for execution of a program as well as a large storage space for storing the program.

In a method for remote downloading and execution of a program written in JAVA or C++, a byte code program is downloaded and then interpreted using a VM, to subsequently be executed. However, such "interpret and execute" method is required where the processors executing the files differ from each other. In contrast thereto, a machine language file with small memory size and rapid execution speed could be used with convenience where the processors executing the files are of a same form.

Further, no byte code program is required for mobile communication devices, since the programs employed at such devices have almost unified specifications.

SUMMARY OF THE INVENTION

The present invention, conceived in view of the aforementioned problems, aims to provide a file construction comprising a header with validity verification function, use period restriction function, and automatic updating function; an execution segment formed in machine language codes; and a resource segment to be selected by languages.

Further, the present invention aims to provide a file construction for mobile communication device capable of enhancing the execution speed by including machine language codes, and thus, reducing the storage size.

In order to achieve the above objectives, a file for mobile communication device in accordance with the present invention comprises a header segment, a file execution segment formed in machine language codes, and a resource segment to be selected by languages; wherein the header includes data for performing one or more of the function of: 1) verifying reliability/validity of the file, 2) restricting use of the file (by period of the use, by times of the use), and 3) automatic updating of the file.

The file execution segment is divided into a RO segment in form of machine language generated by compiling source codes of the file or by interpreting the byte codes, and a RW segment; while the resource segment, being a data (text strings, icons, image data) section, is divided into a resource header part and a resource section part.

A method for downloading and executing the above file in accordance with the present invention using a mobile communication device equipped with a predetermined platform, comprises: a first step, wherein a specific file with the above construction is downloaded via a mobile communication network and the Internet; a second step, wherein reliability or validity of the file is verified using a predetermined data included in the header of the file; and a third step, wherein the file is executed using execution data and data of the resource segment after loading the machine language codes in the execution code segment of the file or after direct accessing by processor of the mobile communication device, if the validity or reliability has been verified.

Further, if the above file is equipped with a use restriction function, an additional fourth step can be added, in which the platform monitors use time or use period of the above file, and prohibits execution of the file if the allowed use time or the allowed use period contained in the file header has been exceeded.

Furthermore, if the above file comprises an automatic updating function, an additional fifth step can be added, in which it accesses a site that has downloaded the corresponding file, using an updating URL string in the file header, and downloads the updated file from it, when the updating conditions are met or a user requests for an updating.

BRIEF DESCRIPTION OF THE DRAWINGS

FIG. 1 shows an internal construction of a conventional file for mobile communication device.

FIG. 2 shows an internal construction of a file for mobile communication device in accordance with the present invention, consisted roughly of a file header, an execution segment, and a resource segment.

FIG. 3 shows in detail the header part of a file for mobile communication device as per the present invention.

FIG. 4 shows in detail the resource segment of a file for mobile communication device as per the present invention.

FIG. 5 is a flowchart showing the processes of downloading and executing a file for mobile communication device as per the present invention.

DETAILED DESCRIPTION OF THE PREFERRED EMBODIMENTS

Now, a description of the preferred embodiment of the present invention is given below, making reference to the accompanying drawings.

FIG. 1 shows an internal construction of a conventional file for mobile communication device, wherein the execution segment is not separated from the resource segment, but rather contained in one single segment together with the latter, while the execution segment is consisted of execution codes formed in byte codes and execution data.

The platform of a communication device that has downloaded such a file has first to interpret the byte codes into machine language codes using a virtual machine, to subsequently execute the file, requiring much time for execution as well as a large memory space which is not easily available in a small mobile communication device, because the byte codes are commonly of greater size than the machine language codes.

FIG. 2 shows an internal construction of a file for mobile communication device in accordance with the present invention, comprising a file header, an execution segment consisted of an RO segment in machine language form and an RW segment, and a resource segment, the reference data to which the execution segment refers during execution of the file.

The RO segment and the RW segment are generated by compiling or interpreting the source codes or byte codes produced.

A detailed description of the construction of file header is given below referring to FIG. 3, and a detailed description of the construction of resource segment is given below referring to FIG. 4.

FIG. 3 shows a detail construction of header part of a file for mobile communication device as per the present invention, in which the file header includes data required for performing specific functions, although the data is not used as such by the platform in contrast to the execution segment and the resource segment.

A file header used in the present invention is divided roughly into fixed fields and variable length fields.

The fixed fields are fields with fixed lengths comprising location and size data on the execution segment for execution of a file, data on starting location of library initialization function contained in the execution segment, data on the location and size of the resource segment, which is an aggregate of data contained to correspond to the designated area and language, data for confirming reliability and validity of the file, etc.

The types of data contained in the fixed fields of the header are as shown in Table 1 below.

TABLE 1

| Field Name | Size (Byte) | Characteristics or Function |
| --- | --- | --- |
| Magic Number | 4 | XOR value of checksum and application ID |
| Checksum | 4 | Lower 4 bytes of the sum resulting from additions of all fields in the header segment except for the fields "Magic Number" and "Checksum"; the execution segment; and the resource segment. |
| Header Size | 2 | Number of bytes of the whole header including fixed fields and variable fields |
| Application ID | 4 | Application ID embodied by a file |
| Application version | 2 | Application version embodied by a file |
| Type | 2 | Execution file or Library file, Bit field determining API access level |
| Platform version | 4 | Execution platform version for executing machine language codes of the execution segment of the main file |
| RO segment Size | 4 | Size of machine language RO segment contained in the execution segments |
| RW segment Size | 4 | Size of machine language RW segment contained in the execution segment |
| ZI segment Size | 4 | Size of the memory required for execution of the execution segment |
| Resource segment Size | 4 | Size of the resource segment contained in the file |
| Lib init function address | 4 | Location of the function contained in the execution segment, to be called directly prior to execution |
| Entry function | 4 | Execution starting location of the program contained in the main file |
| Expire Date | 2 | Expire date of valid execution of the main file |
| Usage Count | 4 | Number of possible executions of the main file |
| DL | 1 | Number of dynamic link libraries (DLL) used for execution of the main file |
| EH | 1 | Number of static hooking events |
| FA | 1 | Length of the file association string contained in the variable fields of the header |
| MM | 1 | Length of the MIME string contained in the variable fields of the header |
| UR | 1 | Length of the file update URL string contained in the variable fields of the header; for updating a file, the update URL in the variable fields is used |
| MS | 1 | Length of the Manufacturer string contained in the variable fields of the header, i.e. length of the text string indicating manufacturer of the main file |
| CS | 1 | Length of the Copyright string contained in the variable fields of the header |

On the other hand, data(fields) contained in the variable-length fields of the header are as shown in Table 2 below.

TABLE 2

| Field Name | Size (Byte) | Characteristics or Function |
| --- | --- | --- |
| Important Library ID | 4 | ID of the dynamic library used by the program |
| Library revision | 2 | The lowest valid version of the designated dynamic library; A dynamic library of a version higher than the designated version can be used by the application |
| Hook Event Class | 2 | The event class hooked by the application |
| Hook Event ID | 2 | The event ID hooked by the application |
| File Association string | Variable | Text string with file extensions as distinguished by Delimeter characters |
| MIME string | Variable | Text string with MIME strings as distinguished by Delimeter characters |

TABLE 2-continued

| Field Name | Size (Byte) | Characteristics or Function |
|---|---|---|
| Update URL string | Variable | URL of the site referred to for updating of a file |
| Manufacturer string | Variable | Text string indicating manufacturer of a file |
| Copyright string | Variable | Text string indicating the author (copyright holder) of the contents included in a file |

The execution segment is divided into two segments: RO segment and RW segment.

The RO segment is a segment containing machine language codes which can be executed directly by a processor of a mobile communication device. In general, machine language codes are generated using a compiler with inputted source codes of a program. The machine language codes thus generated are stored in the RO segment of a file, and then, loaded to the memory of mobile communication device for execution, or are executed directly without loading in a memory if they are directly accessible to a processor.

The RW segment is a segment containing data in machine language form that can directly be interpreted by a processor of mobile communication device, and is generated by a process same as that for the RO segment, requiring to be loaded in a memory for execution.

The resource segment is a segment containing data used by the machine language programs contained in the execution segment (RO segment and RW segment), which data includes text strings, icons, and image data. These data are contained in the resource segment as classified by languages. An aggregate of such data as classified by languages is called resource section, so that a resource segment is consisted of one or more resource sections and a resource header.

In order to be used, a resource section shall be loaded to a memory selectively in accordance with a language desired by a program. For this purpose, the resource header contains information that enables each resource section to distinguish its language code, observing the language code ISO 639: 1988.

FIG. 4 shows in detail the resource header and the resource section of a resource segment of a file for mobile communication device as per the present invention.

A resource segment in accordance with the present invention is a data segment to which an execution code refers, using a token ID in executing an application. In other words, the execution code extracts resource corresponding to one token ID from the resource segment (resource section) and uses the same, for one token ID means one resource data. Generally, a resource segment comprises resource sections as classified by languages to support multiple languages, so that a plurality of resources corresponding to the number of languages supported exist even for a single token ID. Accordingly, an execution code refers to a resource corresponding to the token ID in the resource section in respect to a supported language.

FIG. 5 is a flowchart showing the processes of downloading and executing a file for mobile communication device as per the present invention.

First, a specific file having the above-described construction is downloaded via mobile communication network and the Internet using a mobile communication device equipped with a predetermined platform (S511).

Since such downloading of file can be performed generally at wireless Internet services using the Internet, a mobile communication network, and a predetermined gateway (WAP gateway), a further description thereof is omitted.

A platform of the mobile communication device verifies reliability and validity of the file downloaded using certain data contained in the header of that file (S512).

For a validity verification of the file, magic number, checksum, and application ID of the above header are used. That is, 4 bytes each of the checksum and the application ID undergo an exclusive OR operation (XOR) to subsequently be compared with the magic number in the header, and the file is verified to be valid only when both numerals are identical to each other.

For a reliability verification of the file, an addition of the whole contents beginning from the file header size field ending with the last part of the file is made by 4 bytes and the lower 4 bytes of a sum resulting from such additions is taken to subsequently be compared with the checksum 4 bytes stored in the header, and the program is verified to be reliable only when both numerals are identical to each other.

A file can be allowed for execution only when both validity and reliability thereof have been verified (S513). However, it can also be so designed that a file is allowed for execution when either validity or reliability thereof has been verified.

As such, a file is executed upon verification of its validity and/or reliability. For execution of a file, execution section of the file is loaded in a memory provided that the necessary memory space is secured, or an execution view is generated without such loading in a memory if a direct access is available (S516). Thus, an execution view means a status, when a processor is loaded in a memory so that it can execute a program, or when a processor is ready to execute a file without such loading in a memory. When an execution view is generated, a resource section corresponding to a resource segment as determined by a language selected in the communication device is loaded in the memory (S517).

A file is executed by performing predetermined function thereof using the generated execution view and the resource section loaded (S518).

Additional steps of monitoring use times and use period of the file (S515) and of prohibiting execution of the file by the platform when the use time or the use period limitation contained in the file header has reached (S522), in case use of the file has been limited in use times or use period by allocating certain values to "Usage Count" field or "Expire Date" field in the above file header (S514).

Further, in case the file header comprises an automatic updating function with allocated values for "UR" field and "URL String" field of the file header (S519), an additional step of accessing a site for downloading the corresponding file using the update URL string in the file header and then updating the file with the data downloaded from that site (S521), if the updating conditions are met or a user requests for an updating (S520).

The updating conditions can comprise an updating after a predetermined period of time, an updating after a predetermined times of execution of the file, and the like.

Although the present invention has been described above with reference to the preferred embodiments, the scope of the rights of the subject invention is not restricted thereto, but rather, shall be determined by the claims attached herein below and their equivalents, allowing various alterations, modifications, and adjustments, as those skilled in the art will understand.

As described above, the present invention, by constructing the execution segment of a file in machine language codes that can be directly executed by a mobile communication device, provides various advantages mentioned below:

Since a machine language code is of smaller size than that of a byte code based program (file), the present invention enables not only to shorten the time required for downloading a file, but also to reduce the space required for storing the downloaded file.

A machine language code, being able to be executed directly by a processor, can be executed more rapidly than a byte code based program. Execution of a machine language code program is normally eight to twenty times quicker than that of a program requiring compiling or interpretation.

Furthermore, the present invention, by separating the resource segment from the execution segment of a program and by constructing the file in a manner that data are separated by languages for easy support of multiple languages, so that only those data required for execution are loaded in the memory and used, allows to reduce the memory size required for execution of a file.

The present invention, by using file header, enables performing of validity verification as well as reliability verification of a file, limiting use of a file, and automatic updating of a file.

Finally, the present invention, by enabling various limitations on use of a file (program) for wireless communication device in terms of use times, use periods, etc., allows billing for the contents in diverse manners.

What is claimed is:

1. A computer-readable medium storing computer-executable instructions to be utilized in a mobile communication device having a communication facility for providing mobile communication, comprising:

providing a header of a file downloaded via a mobile communication network;

providing a file execution segment of said file, the execution segment being formed in machine language codes and divided into a RO (Read-Only) segment executed directly by a processor of the mobile communication device, and RW (Read-Write) segment containing data directly interpreted by the processor of the mobile communication device; and providing a resource segment in said file, the resource segment having a plurality of resource sections classified by languages to support multiple languages, one of which is to be loaded to memory selectively and used by the machine language codes, wherein said header includes data field for performing one or more of the functions of: (1) verifying reliability/validity of said file, (2) restricting use of said file by period of the use, and by times of the use, and (3) automatic updating of said file.

2. The method of claim 1, wherein the multiple languages are multiple natural languages.

3. A method for downloading and executing a file in a mobile communication device equipped with a platform, the method comprising:

a first step, wherein said file is downloaded via a mobile communication network;

a second step, wherein reliability and/or validity of said file are verified using data included in a header of said file;

if said validity and/or reliability are verified, a third step, wherein said file is executed by loading an execution segment of said file, said execution segment being machine language code directly executed by a processor of said mobile communication device, said file including a resource segment having a plurality of resource sections classified by languages to support multiple languages, one of which is to be loaded to memory selectively and used by the machine language code;

if said file is equipped with a use restriction function, a fourth step, in which said platform monitors use time or use period of said file, and prohibits execution of said file if said use time or use period exceeds an allowed use time or an allowed use period contained in said file header, and if said file header comprises an automatic updating function, an additional fifth step, in which said platform accesses a site from which the file has been downloaded, and downloads an updated file from the site using an updating Uniform Resource Locator (URL) string in said file header, when the updating conditions are met or a user requests for an updating.

4. The method of claim 3, wherein the multiple languages are multiple natural languages.

* * * * *